United States Patent [19]

Pollard

[11] Patent Number: 4,647,105

[45] Date of Patent: Mar. 3, 1987

[54] OPENING ROOF FOR A MOTOR VEHICLE

[75] Inventor: John W. Pollard, Birmingham, England

[73] Assignee: Britax Weathershields, Birmingham, England

[21] Appl. No.: 836,012

[22] Filed: Mar. 4, 1986

[30] Foreign Application Priority Data

Mar. 13, 1985 [GB] United Kingdom ............... 8506558

[51] Int. Cl.[4] .......................... B60J 7/05; B60J 7/057; B60J 7/185
[52] U.S. Cl. .................................... 296/221; 296/222; 296/224; 296/223; 292/263; 49/325; 217/60 G
[58] Field of Search ................ 296/216, 221–224; 49/325; 292/263; 217/60 E, 60 G

[56] References Cited

U.S. PATENT DOCUMENTS

| 4,420,184 | 12/1983 | Kaltz | 296/221 |
| 4,601,512 | 7/1986 | Boots | 296/221 |

FOREIGN PATENT DOCUMENTS 0140491 5/1985 European Pat. Off. ............ 296/223

Primary Examiner—Robert B. Reeves
Assistant Examiner—Dennis H. Pedder
Attorney, Agent, or Firm—Hayes, Davis & Soloway

[57] ABSTRACT

An opening roof assembly for a motor vehicle comprises a rigid panel adapted to close an opening in the vehicle roof with the panel supported at each side by front and rear guide means on respective guide tracks extending along each side of an opening in the vehicle roof and behind said opening below the vehicle roof. The front guide means permit pivotal movement of the panel about a horizontal axis at right-angles to the guide tracks and each rear guide means comprises a guide shoe arranged to be driven along the corresponding guide track and a chain comprising first and second links, the first link having a first pivot at one end connected to the shoe and a second pivot at the other end connected to one end of the second link, the other end of which has a third pivot connected to the roof panel. A third link is pivotally attached at one end to the third pivot and has a control pin at its other end adapted to retain the first link at a predetermined angle to the shoe when in a first state, and to retain the first link at a predetermined angle to the second link when in a second state.

7 Claims, 9 Drawing Figures

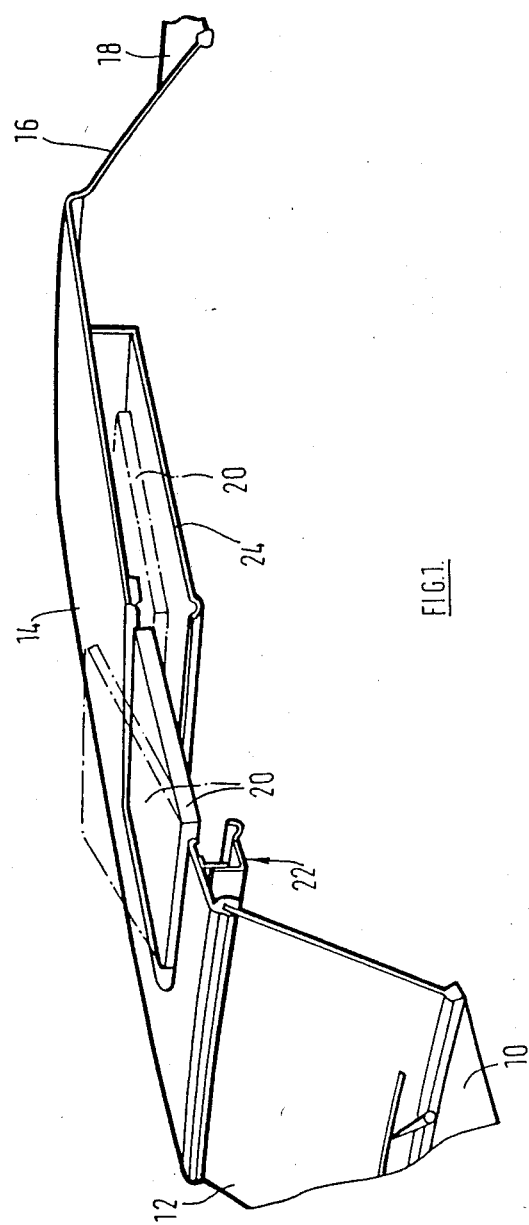

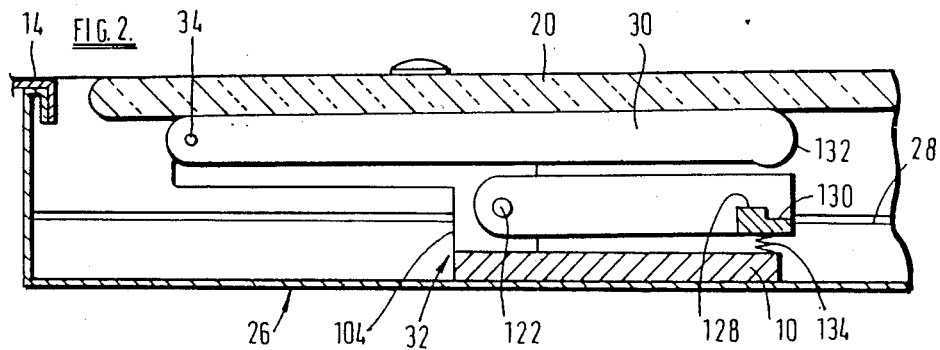
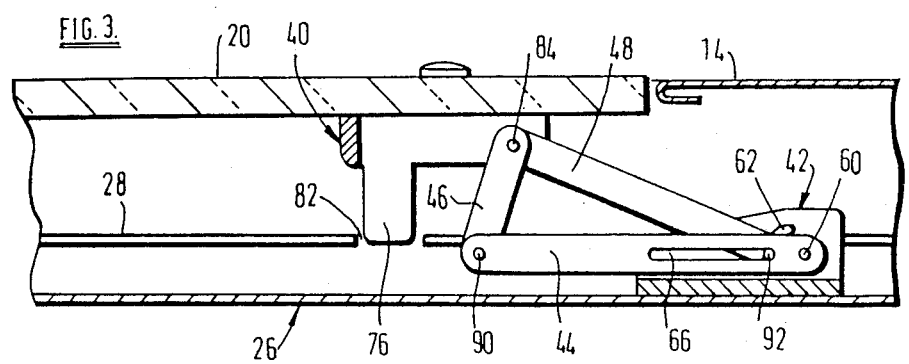
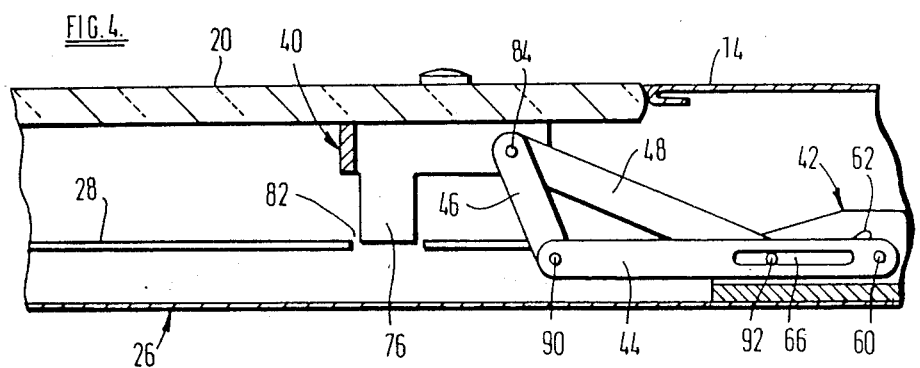

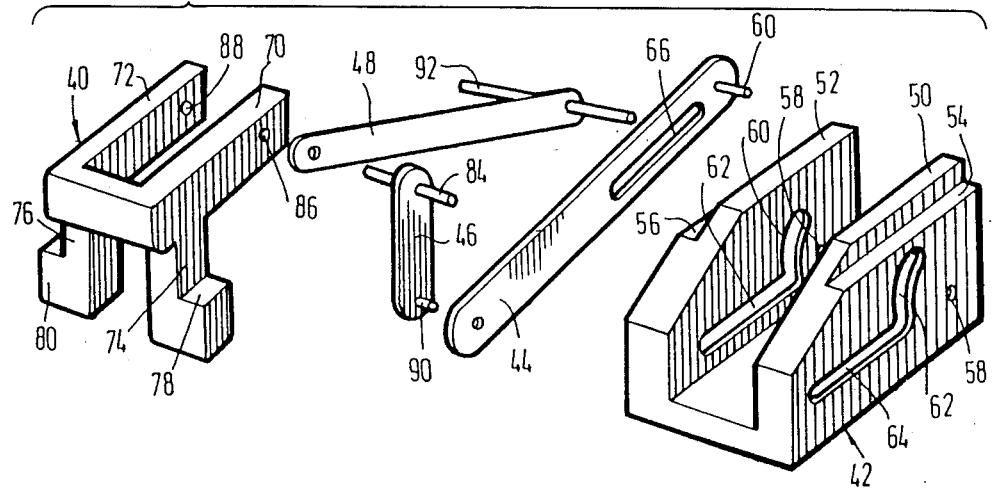
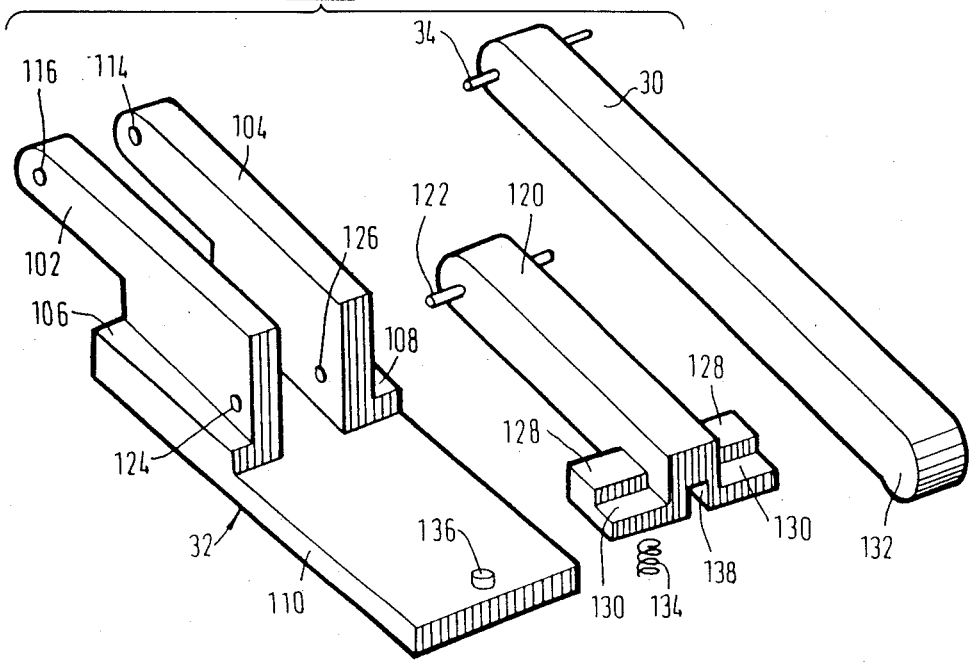

OPENING ROOF FOR A MOTOR VEHICLE

This invention relates to an opening roof assembly for a motor vehicle of the type comprising a rigid panel closing an opening in the vehicle roof and which is supported at each side by front and rear guide means on respective guide tracks extending along each side of an opening in the vehicle roof and behind said opening below the vehicle roof, the front guide means being adapted to permit pivotal movement of the panel about a horizontal axis at right-angles to the guide tracks and each rear guide means comprising a guide shoe arranged to be driven along the corresponding guide track and a chain comprising first and second links, the first link having a first pivot at one end connected to the shoe and a second pivot at the other end connected to one end of the second link, the other end of which has a third pivot connected to the roof panel.

Thus the panel can be opened either by pivoting the panel upwardly about a transverse horizontal axis adjacent to its front edge, so that the rear edge of the panel is above the vehicle roof, or by sliding the panel rearwardly below the vehicle roof behind the opening.

An opening roof of this kind is disclosed in our European Patent Application No. 84305314. Each of the connections at the ends of the chain of each rear support means, and between adjacent links thereof, is arranged to permit relative angular movement over a limited range between an orientation such that adjacent links are in line with each other and parallel to the guide rail and an orientation such that adjacent links are at obtuse angles to each other and project above the guide rail.

According to the invention, in an opening roof assembly of this type, a third link is pivotally attached at one end to the third pivot and has a control means at its other end adapted to retain the first link at a predetermined angle t the show when in a first state, and to retain the first link at a predetermined angle to the second link when in a second state.

Preferably, the rear shoe contains a first slot having an arcuate portion centered on the first pivot and a linear portion extending radially from one end of the arcuate portion in a direction parallel to the track, the first link has an elongate second slot of the same dimensions as said linear portion and located at the same distance thereas from the first pivot, and the control means comprises a pivot pin which projects through the first and second slots. When the control means is in its first state, the pivot pin is located in the linear portion of the first slot away from the arcuate portion thereof. When the control means is in its second state, the pivot pin is located in the arcuate portion of the first slot away from the linear portion thereof.

Each front support means may comprise a front guide shoe, a support member secured to the panel and pivotally connected to the front shoe, a latch member pivotally mounted on the front shoe and having a latching formation which engages with a complementary formation on the track to prevent movement of the front shoe along the track, resilient means for biasing the latching formation into engagement with the complementary formation and release means on the support member arranged to move the latching formation out of engagement with the complementary formation as the rear edge of the panel is lowered below the vehicle roof.

An embodiment of the invention will now be described, by way of example, with reference to the accompanying drawings, in which:

FIG. 1 is a fragmentary perspective sectional view of a motor car fitted with an opening roof assembly of the first kind to which the invention relates, showing the panel in its closed position and each of its two alternative open positions;

FIG. 2 is a longitudinal sectional view of the front part of the opening roof assembly shown in FIG. 1, with the panel in its closed position;

FIG. 3 is a longitudinal sectional view of the rear part of the opening roof assembly shown in FIGS. 1 and 2, with the panel in its closed position;

FIG. 4 is a longitudinal sectional view, similar to FIG. 3, with the panel still in its closed position but with part of the mechanism in an alternative position;

FIG. 5 is an exploded view of one of the rear guide means of the sliding roof assembly shown in FIGS. 1 to 4;

FIG. 6 is an exploded view of one of the front guide means of the sliding roof assembly shown in FIGS. 1 to 4;

Figure 7:
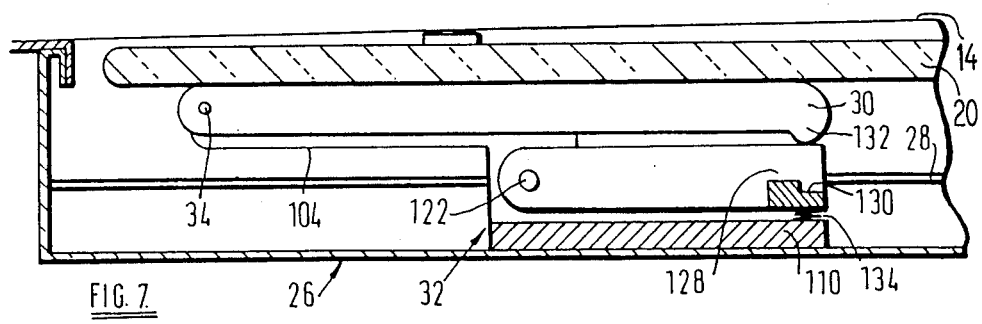
FIG. 7 is a longitudinal sectional view, similar to FIG. 2, but with the rear edge of the panel lowered preparatory to sliding it under the vehicle roof.

FIG. 1 shows the upper part of the body of a saloon motor car comprising a bonnet 10, a windscreen 12, a roof 14, a rear window 16 and a boot 18. A movable glass roof panel 20 is located in a frame 22 bounding an opening in the vehicle roof and including a drain tray 24 forming the bottom of a chamber into which the roof panel 20 can be slid below the vehicle roof 14.

A respective guide track, on which the panel 20 is slidable, extends along each side of the opening in the vehicle roof 14 and into the space above the drain tray 24. FIGS. 2 and 3 show the track 26 on the car driver's right-hand side of the opening in the vehicle roof 14, in longitudinal cross-section. The track consists of a generally U-shaped channel, the side walls of which have respective inwardly directed flanges 28 extending along substantially the whole length thereof. As can be seen from FIG. 2, the front of the panel 20 is mounted on a front bracket 30 which is attached to a front shoe 32 by means of a pivot pin 34. The front shoe 32 is slidable along the track 26.

Turning to FIGS. 3, 4 and 5, the rear support means for the panel 20 comprises a rear bracket 40 which is secured to the panel 20 and connected to a rear shoe 42 by first, second and third links 44, 46 and 48. As can best be seen from FIG. 5, the rear shoe 42, which can be driven along the track 26 by drive means (not shown), is of generally U-shaped cross-section, having two parallel side walls 50 and 52 which project upwardly between the flanges 28 of the track 26 and which have respective shoulders 54 and 56 to engage under these flanges 28. Each side wall 50, 52 also has a respective hole 58 to receive a first pivot pin 60 at one end of the first link 44, and a respective first slot comprising an arcuate portion 62, centered on the holes 58, and a linear portion 64, extending horizontally from the lower end of the arcuate portion 62. The first link 44 contains a second slot 66 which is of the same length as the linear portions 64 of the first slots and is aligned therewith when the first link 44 is horizontal.

The rear bracket 40 has two parallel rearwardly extending limbs 70 and 72 and two parallel downwardly extending limbs 74 and 76, the latter having projections 78 and 80 which are received in gaps 82 in the flanges 28 when the panel is in its closed position as illustrated in FIGS. 3 and 4. A second pivot pin 84, secured to one end of the second link 46, is journaled in holes 86 and 88 in the rearwardly extending limbs 70 and 72 of the rear bracket 40. The other end of the second link 46 is pivotally connected, by a third pivot pin 90, to the opposite end of the first link 44 to that to which the first pivot pin 60 is secured.

The third link 48 is journaled on the second pivot pin 84 at one end and carries a fourth pivot pin 92 at its other end which engages in both the first slots 62, 64 and in the second slot 66. When the fourth pivot pin 92 is at the rear end of the linear portion 64 of the first slots, as illustrated in FIG. 3, the first link 44 is free to pivot about the first pivot pin 60, the fourth pivot pin 92 moving into the arcuate portions 62 of the first slots. On the other hand, if the rear shoe 42 is moved rearwardly along the track to the position in FIG. 3, angular movement between the first link 44 and the rear shoe is prevented by engagement of the fourth pivot pin 92 with the linear portion 64 on the one hand and the second slot 66 on the other. There is no significant change in the position of the panel 20 as the rear shoe 32 moves between the positions shown in FIG. 3 and those shown in FIG. 4; the panel 20 is effectively closed when the rear shoe 32 is in any intermediate position therebetween.

As can be seen from FIG. 6, the front shoe 32 has side walls 102 and 104 which extend upwardly between the flanges 28 of the track and shoulders 106 and 108 which engage thereunder. The side walls 102 and 104 project beyond the base 110 of the front shoe 100 in the forward direction while the base 110 projects beyond the side walls 102 and 104 in the rearward direction. The thickness of the base 110 is approximately half the height of the shoulders 106 and 108.

The pivot pin 34, connecting the front bracket 30 to the front shoe 32, is journaled in holes 114 and 116 in the front ends of the side walls 102 and 104 respectively. A latch member 120 is located between the rear half of the front bracket 30 and the base portion 110. At its front end, the latch member 120 has a pivot pin 122 which is journaled in holes 124 and 126 in the rear ends of the side walls 102 and 104 respectively. At its rear end, the latch member has a respective latching projection on each side, each projection having a front portion 128, of thickness slightly less than the difference between the height of the shoulders 106 and 108 and the thickness of the base porton 110 of the front shoe 100, and a back portion 130 of approximately half the thickness of the front portion 128. The front bracket 30 has a downwardly projecting nose 132 on its rear end which can engage with the upper surface of the latch member 120. A compression spring 134 is located on a peg 136 on the base member 110 and accommodated in a recess 138 ion the latch member 120 so as to bias the rear end of the latter in the upward direction.

When the panel 20 is in its closed position level with the vehicle roof 14 as illustrated in FIG. 2, the nose 132 on the front bracket 30 is out of engagement with the top of the latch member 120, the rear end of which is therefore urged upwardly by the spring 134. The thicker parts 128 of each of the latching projections engaged in gaps (not shown) in the flanges 28 similar to the gaps 82 at the rear end of the roof opening (see FIGS. 3 and 4), thus preventing rearward movement of the front shoe 32. The thinner parts 130 of the latching projections engage under the flanges 28 behind these gaps, thus limiting upward movement of the rear end of the latch member 120.

Figure 8:
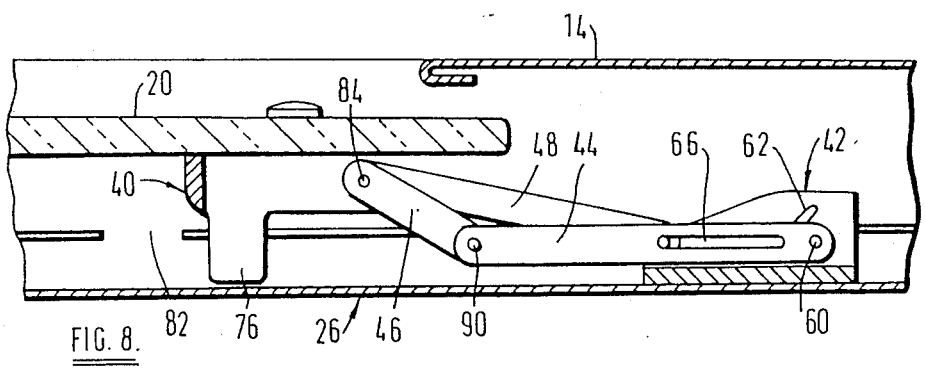
FIG. 8 is a longitudinal sectional view, similar to FIG. 3, with the rear edge of the panel lowered preparatory to sliding it under the vehicle roof.

When the rear edge of the panel 20 is lowered, prior to sliding it under the vehicle roof 10, the rear shoe 42 is moved rearwardly from the position shown in FIG. 3 to bring the fourth pivot pin 92 to the front end of the slot 66, thus pivoting the second link 46 to a more horizontal position and lowering the projections 78 and 80 on the downwardly extending limbs 74 and 76 of the rear bracket 40 below the flanges 28. At the same time, the front bracket 30 pivots in the clockwise direction to the position illustrated in FIG. 7, in which the nose 132 presses downwardly on the top of the latch member 120 so as to compress the spring 134 and disengage the thicker portions 128 of the latching projections from the slots in the flanges 28. The front shoe 32 is then free to slide along the track 26. Continued rearward movement of the panel 20 causes simultaneous rearward movement of the panel 20 and the front shoe 32, first to the position shown in FIG. 8 and then to a fully open position (not shown). Forward movement of the rear shoe 42 causes the panel 20 to return to its closed position, as illustrated in FIGS. 2 and 4, engagement of the projections 78 and 80 (on the rear bracket 40) with the underside of the flanges 28 preventing the rear edge of the panel 20 being raised until it is aligned with the opening in the vehicle roof.

Figure 9:
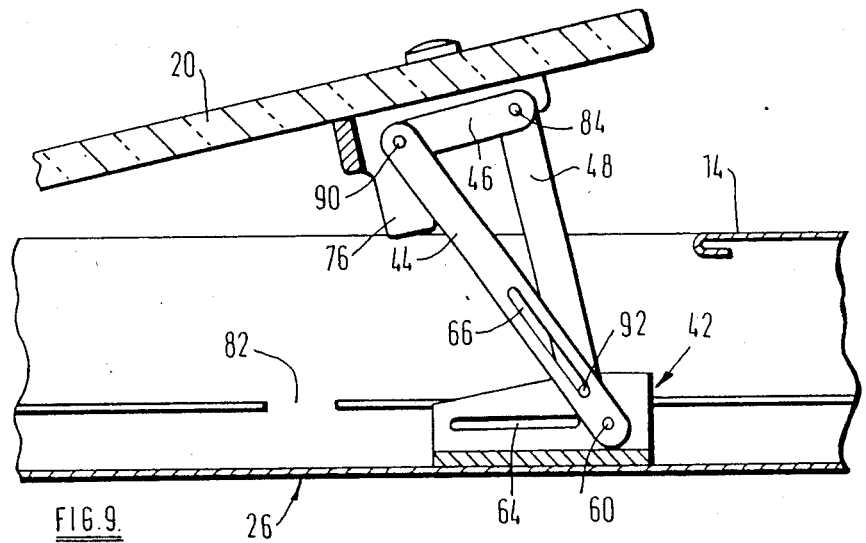
FIG. 9 is a longitudinal sectional view, similar to FIG. 3, with the rear edge of the panel raised above the vehicle roof.

When the rear edge of the panel is to be raised, the rear shoe 42 is moved forwardly from the position shown in FIG. 3 to the position shown in FIG. 9. The fourth pivot pin 92 moves to the upper end of the arcuate portions 62 of the first slots, locking the three links 44, 46 and 48 together as a rigid structure. At the same time, the front bracket 30 pivots on its pivot pin 114 in an anti-clockwise direction and the latch member 120 remains in the position illustrated in FIG. 2, with the thicker portions 128 of the latching projections remaining in engagement with the slots in the flanges 28, thus preventing rearward movement of the front shoe 32.

The mechanism supporting the panel on the other side of the roof opening is identical with that described above.

I claim:

1. An opening roof assembly for a motor vehicle, comprising a rigid panel adapted to close an opening in the vehicle roof, a guide track extending along a side of the opening and behind said opening below the vehicle roof, front and rear guide means supporting the panel on the guide track, the front guide means being adapted to permit pivotal movement of the panel about a horizontal axis at right-angles to the guide track and the rear guide means comprising:

a guide shoe arranged to be driven along the corresponding guide track, first, second and third links, the first link having a first pivot at one end connected to the shoe and a second pivot at the other end connected to one end of the second link, the other end of the second link has a third pivot connected to the roof panel, and the third link is pivotally attached at one end to the third pivot, and control means at another end of the third link adapted to retain the first link at a predetermined angle to the shoe when in a first state, and to retain the first link at a predetermined angle to the second link when in a second state.

2. A roof assembly according to claim 1, wherein the control means is arranged, when in its first state, to retain the first link parallel to the track and to allow the second link to move between a first position in which the panel is level with the vehicle roof and a second position in which the panel is below the vehicle roof.

3. A roof assembly according to claim 2, wherein the control means is arranged to retain the second link at an angle to the first link which is less than 90 deg when the second link is in its first position and greater than 90 deg when the second link is in its second position.

4. A roof assembly according to claim 3, wherein the rear shoe contains a first slot having an arcuate portion centered on the first pivot and a linear portion extending radially from one end of the arcuate portion in a direction parallel to the track, the first link has an elongate second slot of the same length as said linear portion and located at the same distance from the first pivot as the linear portion, and the control means comprises a pivot pin which projects through the first and second slots, the central means being in its first state when said pivot pin is located in the linear portion of the first slot away from the arcuate portion thereof and the control means being in its second state when the pivot pin is located in the arcuate portion of the first slot away from the linear portion thereof.

5. A roof assembly according to claim 2, wherein the rear shoe contains a first slot having an arcuate portion centered on the first pivot and a linear portion extending radially from one end of the arcuate portion in a direction parallel to the track, the first link has an elongate second slot of the same length as said linear portion and located at the ame distance from the first pivot as the linear portion, and the control means comprises a pivot pin which projects through the first and second slots, the control means being in its first state when said pivot pin is located in the linear portion of the first slot away from the arcuate portion thereof and the control means being in its second state when the pivot pin is located in the arcuate portion of the first slot away from the linear portion thereof.

6. A roof assembly according to claim 1, wherein the rear shoe contains a first slot having an arcuate portion centered on the first pivot and a linear portion extending radially from one end of the arcuate portion in a direction parallel to the track, the first link has an elongate second slot of the same length as said linear portion and located at the same distance from the first pivot as the linear portion, and the control means comprises a pivot pin which projects through the first and second slots, the control means being in its first state when said pivot pin is located in the linear portion of the first slot away from the arcuate portion thereof and the control means being in its second state when the pivot pin is located in the arcuate portion of the first slot away from the linear portion thereof.

7. A roof assembly according to claim 1, wherein each front support means comprises a front guide shoe, a support member secured to the panel and pivotally connected to the front shoe, a latch member pivotally mounted on the front shoe and having a latching formation adapted to engage with a complementary formation on the track to prevent movement of the front shoe along the track, resilient means for biasing the latching formation into engagement with the complementary formation and release means on the support member adapted to move the latching formation out of engagement with the complementary formation as the rear edge of the panel is lowered below the vehicle roof.

* * * * *

UNITED STATES PATENT AND TRADEMARK OFFICE
CERTIFICATE OF CORRECTION

PATENT NO. : 4,647,105

DATED : March 3, 1987

INVENTOR(S) : John William POLLARD

It is certified that error appears in the above—identified patent and that said Letters Patent is hereby corrected as shown below:

Claim 5, column 5, line 38, substitute --same-- for "ame".

Signed and Sealed this

Thirteenth Day of October, 1987

*Attest:*

DONALD J. QUIGG

*Attesting Officer*     *Commissioner of Patents and Trademarks*